Sept. 7, 1943.                    H. F. PARKER                    2,328,670
                        AUTOMATIC STEERING CONTROL SYSTEM
                            Filed Jan. 3, 1940            6 Sheets-Sheet 1

INVENTOR.
Humphrey F. Parker
BY John J. Rogan
ATTORNEY

Sept. 7, 1943.   H. F. PARKER   2,328,670
AUTOMATIC STEERING CONTROL SYSTEM
Filed Jan. 3, 1940   6 Sheets-Sheet 3
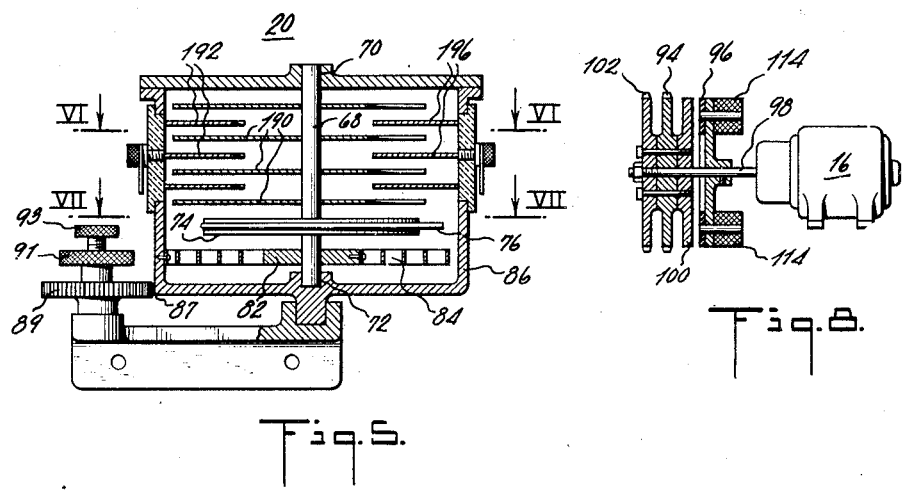
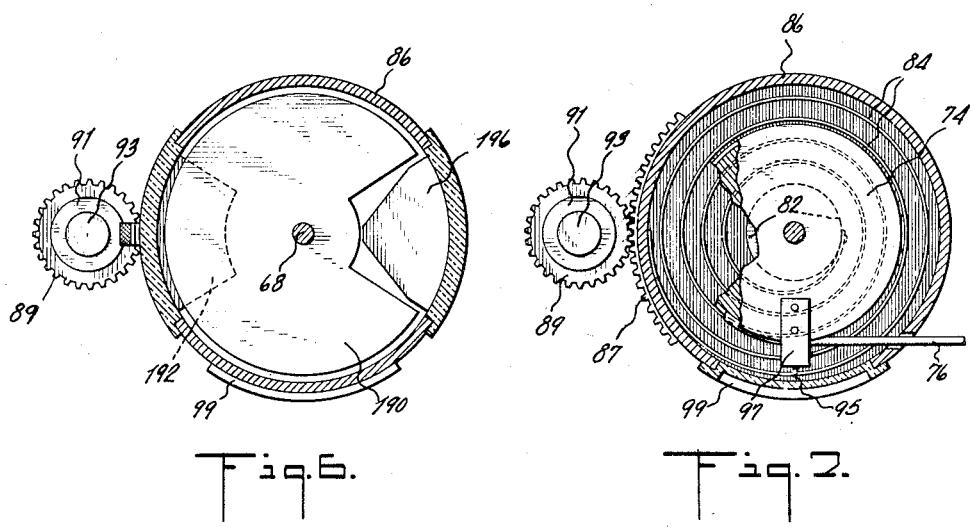
Humphrey F. Parker
INVENTOR.
BY John J. Logan
ATTORNEY Sept. 7, 1943.   H. F. PARKER   2,328,670
AUTOMATIC STEERING CONTROL SYSTEM
Filed Jan. 3, 1940   6 Sheets-Sheet 4

Humphrey F. Parker
INVENTOR.

BY

John J. Logan
ATTORNEY.

Sept. 7, 1943.    H. F. PARKER    2,328,670
AUTOMATIC STEERING CONTROL SYSTEM
Filed Jan. 3, 1940    6 Sheets-Sheet 6

RUDDER    COMPASS

Humphrey F. Parker
INVENTOR.

BY John J. Logan
ATTORNEY.

Patented Sept. 7, 1943

2,328,670

UNITED STATES PATENT OFFICE 2,328,670

AUTOMATIC STEERING CONTROL SYSTEM

Humphrey F. Parker, Kenmore, N. Y.

Application January 3, 1940, Serial No. 312,249

16 Claims. (Cl. 172—282)

This invention relates to control systems and more particularly to an improved form of automatic control system. The invention has for its principal object to provide a novel form of control suitable for use in automatic steering.

Another object of the invention is, in an automatic steering system, to simulate the movements made by a helmsman in manual steering. This involves certain departures from a straight follow-up system between compass and rudder elements. For example, having applied a certain angle of rudder for a given initial angle of deviation from the course, the helmsman applies decreasing angular increments of rudder for additional increments of compass deviation. Also, having checked the yaw, on the commencement of the vessel's return to its course the helmsman immediately removes a relatively large amount of rudder. In other words, both in applying and removing rudder, the rudder is initially given a lead over the average deflectional requirement, and later is caused to lag behind the average.

A further object of the invention is to provide a very simple means for adjusting the amplitude of rudder movement required to correct for given deviations from the course.

A further object is to provide simple means for adjusting amount of lead to be given to the rudder when the craft is returning to its course.

Another object is to provide means for adjusting the lag between the movements of the directional indicator and the steering element, and particularly the amount of lead permitted the compass in the return to the course before initiating rudder removal.

Another object of the invention is to eliminate mechanical lost motion between the movements of the directional indicator and the member moving in synchronism with the rudder.

Another object is to provide means for adjusting the neutral position of the rudder responsive element in relation to the neutral position of the indicating element.

Another object is to provide a simple course setting and controlling device.

Still another object is to provide a system capable of accurate control which is simple, cheap, and capable of easy installation in a vessel already in service.

Other features and advantages not specifically enumerated will be apparent after a consideration of the following description and the appended claims.

While the invention will be described herein as embodied in specific forms and organizations of apparatus, it is understood that this is done for purposes of explanation and not by way of limitation.

Accordingly,

Fig. 5 is a vertical section through a member adapted to move in synchronism with the rudder.

Fig. 6 is a section along the line VI—VI of Fig. 5.

Fig. 7 is a section along the line VII—VII of Fig. 5.

Fig. 8 is a side view of a motor for moving the rudder and of means for clutching this motor to the rudder cables.

Figure 1:
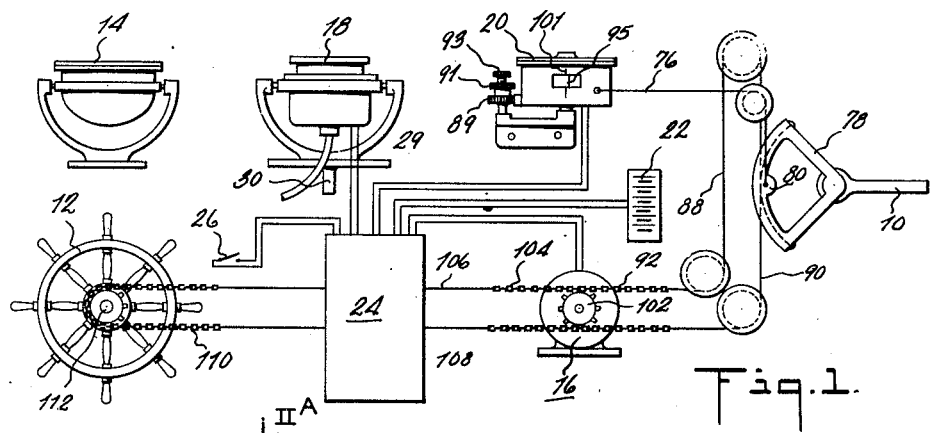
Fig. 1 is a diagrammatic arrangement of the elements comprising the invention.
Figure 3:
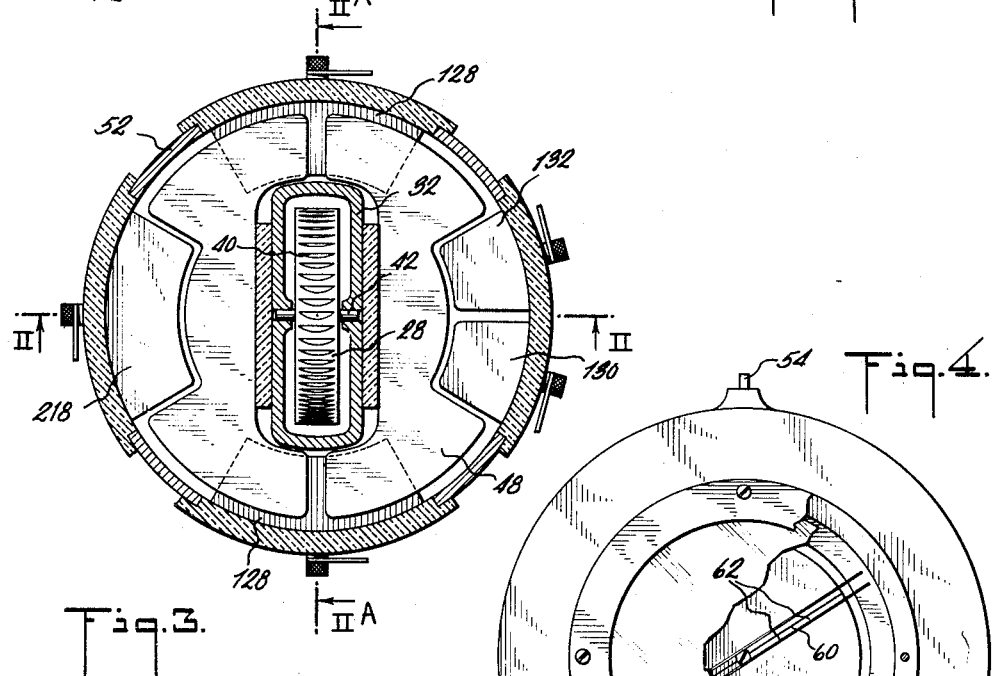
Fig. 3 is a section through the directional indicator of Fig. 2, taken along the line III—III.
Figure 4:
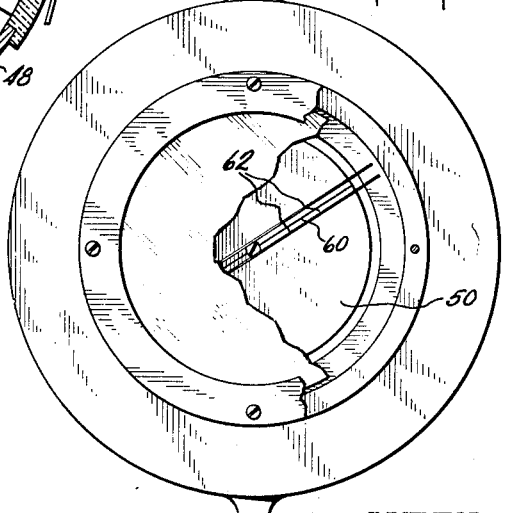
Fig. 4 is a plan view of the directional indicator of Fig. 2.

Referring now to Fig. 1, existing elements of a manual steering system are shown as a rudder 10; a steering wheel 12; and a magnetic compass 14. Additional elements needed for the practice of this invention are a source of power for turning the rudder, as the motor 16; a course setting element 18; a rudder responsive element 20; a source of electrical energy shown as the battery 22; a controller 24 for comparing the indications of the elements 18 and 20 and for suitably energizing the motor 16; and a master switch 26.

Figure 2:
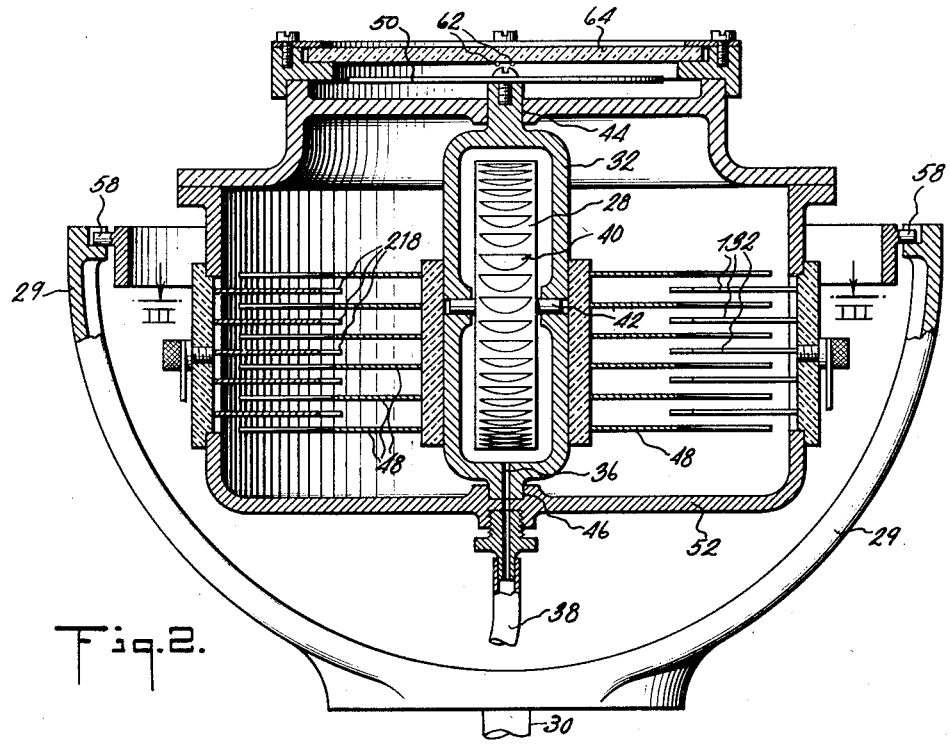
Fig. 2 is a vertical sectional view of the directional indicator and course selector shown in Fig. 1.
Figure 2A:
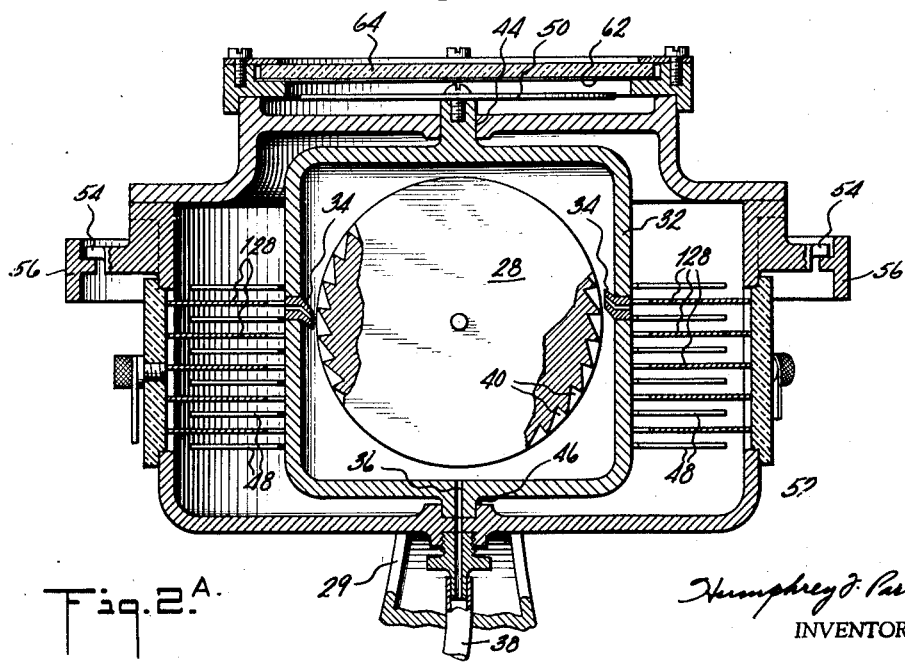
Fig. 2a is another vertical sectional view of the directional indicator and course selector of Fig. 1 taken at right angles to that of Fig. 2.

The course setting element 18 comprises a direction seeking member 28, shown as a gyro wheel, and a settable member. In the combination shown in Fig. 2 the yoke 29 is mounted on a pivot 30, so that the whole instrument, except the internal gyro element which remains fixed in azimuth, may be rotated manually for course setting purposes. The gyro wheel may be driven in any suitable manner but as shown is intended for operation by air pressure. With this in view the wheel is enclosed in a casing 32, substantially airtight except for the orifices 34 and the outlet 36. Said outlet 36 is connected by the flexible tube 38 to a source of suction such as the intake manifold of an internal combustion engine. The space inside chamber 32 is accordingly evacuated, and air flows in through orifices 34, impinging on the vanes 40 cut in the periphery of wheel 28 and causing the rotation of said wheel at a high rate of speed. Because of the well-known characteristics of gyroscopic wheels, member 28 tends to adopt a fixed axis of rotation about its shaft 42. Now gyro casing 32 is supported in vertical bearings 44 and 46, in which it, with the gyro wheel, turns when the vessel yaws. Casing 32 carries condenser plates 48 and card 50. Bearings 44 and 46 are carried by an outer case 52, supported by trunnions 54 in gimbal ring 56, which in turn is supported by trunnions 58 resting in bearings in the yoke 29. While this simple gyro wheel remains substantially fixed in azimuth for considerable periods of time, it does not possess full direction indicating properties. For this reason course setting unit 18 is used in conjunction with a magnetic compass, which will always be found adjacent the steering wheel for use when necessary in manual steering. In this system of automatic steering the vessel is first set upon a selected course manually, by manipulation of the hand steering wheel 12. Then the yoke 29 or the settable head 31 is adjusted until the wires 62, attached to the underside of the glass 64, lie parallel with the line 66 marked upon the upper surface of the disc or card 50.

The rudder responsive unit 20 comprises a shaft 68 rotatable in bearings 70 and 72. This shaft supports a drum or grooved wheel 74 to the periphery of which is attached the light cable or wire 76. Cable 76 through suitable pulleys and gearing if necessary, is attached to the rudder quadrant 78 at 80. Shaft 68 also supports a drum 82, to the periphery of which is attached one end of the coil spring 84, the other end of said spring being fixed to the casing 86. Before attachment of the cable 76 to the rudder quadrant, spring 84 is wound up to a suitable tension. Movement of the rudder in one direction thus further winds up the spring 84, and turns the shaft 68 through an angle corresponding to the angular movement of the rudder. When the rudder moves in the opposite direction, the spring partially unwinds, keeping the cable taut and causing the shaft 68 again to turn through an angle corresponding to that of the rudder movement. There is thus no lost motion between the angular movements of shaft and rudder.

To the quadrant 78 are attached the steering cables 88 and 90. These are provided with a chain 92 which engages the teeth of the sprocket wheel 94. Wheel 94, when not engaged by the clutch 96 fixed to motor shaft 98, is free to turn on shaft 98. Rotating with sprocket wheel 94 on shaft 98 and fixed to said wheel are clutch plate 100 and a second sprocket wheel 102. The teeth of this sprocket engage chain 104, attached to one pair of ends of the cables 106 and 108. The other ends of 106 and 108 carry chain 110 which engages sprocket wheel 112 fixed to the steering wheel 12. When the clutch is not engaged therefore, movement of the steering wheel 12 causes rudder movement in the normal manner. Closing of switch 26 however energizes coils 114 of the clutch 96, and thereafter the steering cables and the rudder move in accordance with the rotation of shaft 98 of motor 16.

While the casing 86 of rudder responsive unit 20 is normally fixed, provision is made for adjusting its zero position. Casing 86 is provided with a circular rack 87, which is engaged by gear 89, which in turn is adjustable by the knurled knob 91. Knob 93 is provided for locking gear 89 in a fixed position. The position of the rudder is shown by the line 95 on plate 97 visible through window 99, and may be compared with the adjusted neutral which is shown by line 101 on casing 86.

Figure 9:
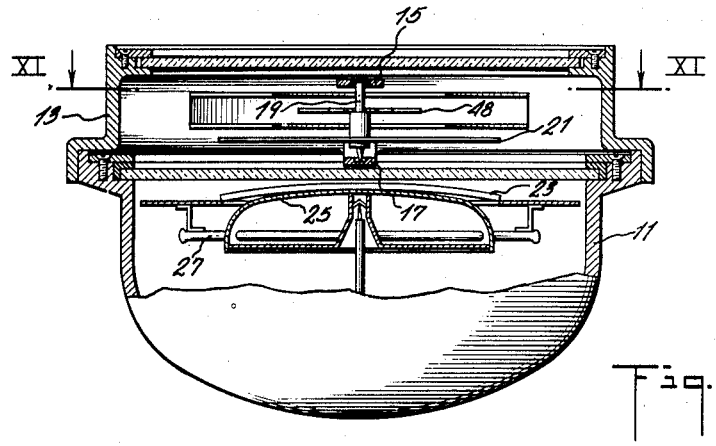
Fig. 9 is a vertical section through a modified form of directional indicator.
Figure 10:
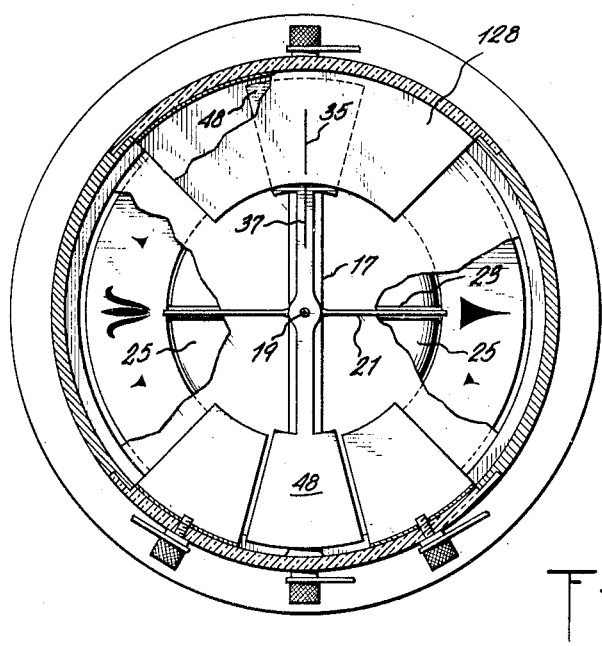
Fig. 10 is a plan view of the indicator of Fig. 10.

In Figs. 9 and 10 is shown a course setting device which is direction seeking as well as direction indicating and which replaces units 14 and 18 of Fig. 1 by a single unit 11 combining the functions of both. This unit is substantially a magnetic compass of any standard type to which is added an adjustable head, plus means for coupling the movable member of the head with the movable member of the compass. The adjustable head comprises a settable casing 13 provided with supports 15 and 17 for the vertical shaft 19. Shaft 19 supports condenser plates 48 and also one member of a magnetic coupling, i. e., the magnetic needle 21. The other element of this coupling is a magnetic needle or set of needles 23 placed above the float 25 of the compass 11. Needle 23 is preferably aligned with the main group of needles 27 forming the direction seeking element of the compass. As a result of this coupling condenser plates 48 remain fixed in azimuth. The course to be steered is set by rotation of the head 13. For example, after the vessel has been placed upon its course manually the head may be moved until the line 35 upon condenser plate 128 is brought into coincidence with the line 37 upon condenser plate 48.

Figure 11:
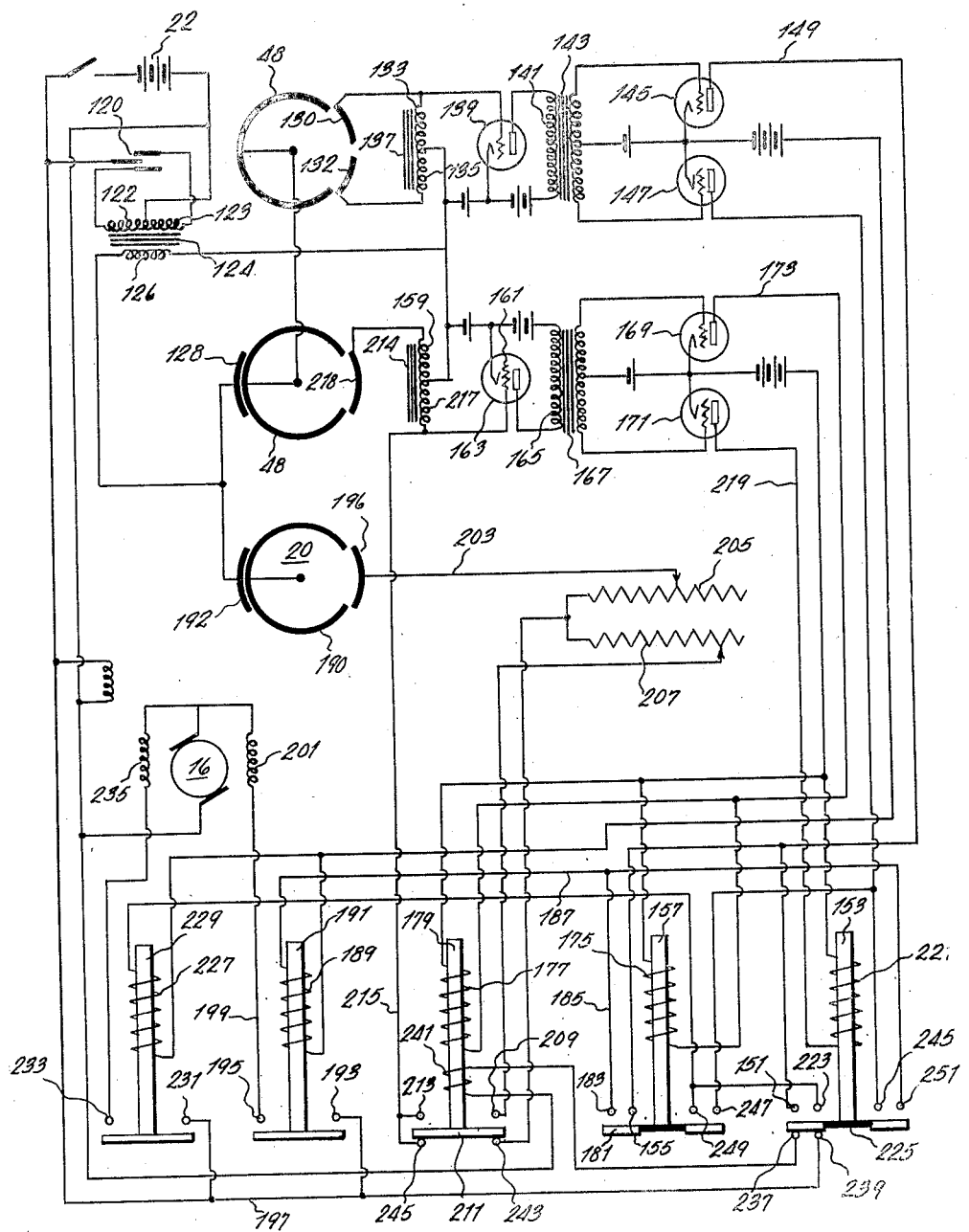
Fig. 11 is a diagram of the electrical circuits for the system of Fig. 1.

In Fig. 11 are shown the electrical circuits for controlling the operation of the steering motor 16. Direct current from the source 22, which may for example be the twelve volt storage battery associated with the engine driving the vessel's propeller, is passed through the interrupter or vibrator 120. The interrupted current then passes through primary coils 122 and 123 of step up transformer 124. Alternating current from the secondary coil 126 is then applied to condenser plate or plates 128 supported by but insulated from the outer casing 52 of the course selector unit. As a result a corresponding alternating current is induced in condenser plates 48, supported by but insulated from the casing 32 of the gyro unit. Associated with condenser plates 48 are two further sets of condenser plates 130 and 132. Plates 48 however are so shaped and placed that when the vessel is on its course they overlap neither of the sets of plates 130, 132. When the vessel moves off its course however, one or other of these sets is engaged, according to the direction of the deviation.

The outputs from 130, 132 are applied to oppositely wound coils 133, 135 of the autotransformer 137, and the output from this in turn is applied to the grid of the amplifier tube 139, the amplified current from which passes through the primary 141 of transformer 143. The secondary of transformer 143 is connected to the grids of gaseous discharge tubes 145, 147 so that one or other of these tubes is energized to pass current according to the polarity phase of the output of 143, this being dependent upon which of the plates 130, 132 is overlapped by plate 48.

Let us assume that a deviation of the ship from its course occurs such as to cause plate 48 to overlap plate 130 and to energize tube 145. A path for current is now provided by conductor 149 to contact 151 of relay 153 and to contact 155 of relay 157. Simultaneously with this happening, plates 48 also overlap condenser plates 218, energizing coil 159 of autotransformer 214. This in turn energizes grid 161 of amplifying tube 163 and primary 165 of transformer 167. The secondary of 167 is so connected to the grids of gaseous discharge tubes 169, 171, that for this condition tube 169 is energized to pass current, which flows by conductor 173 to the coil 175 of relay 157 and coil 177 of relay 179, energizing these relays. Relay 157 causes plate 181 to bridge the gap between contacts 155 and 183, and hence permits current to flow by conductors 185 and 187 to coil 189 of relay 191. The energization of relay 191 closes the gap between contacts 193 and 195 and permits current to flow from battery 22 by conductors 197 and 199 to coil 201 of steering motor 16. Rudder is thereby applied to correct for the ship's departure from the course. As the rudder is moved, condenser plate 190 of rudder responsive unit 20 also moves and overlaps condenser plate 196, causing a current to flow by conductor 203 to settable resistances 205 and 207 to contact 209. Relay 179 being energized from tube 169 by the overlapping of plate 213 by plate 48, the current continues through plate 211, contact 213 and conductor 215 to coil 217 of transformer 214, where it opposes the current in coil 159 from compass responsive condenser plate 218. As the rudder application continues the current in coil 217 increases until it approximately equals that in coil 159, whereupon the emf at the grid of gaseous discharge tube 169 approaches zero and said tube ceases to pass current. Relay coils 175 and 177 are thus deenergized. Relay 157 falls open and breaks the circuit between contacts 155 and 183 thereby deenergizing relay 191 and stopping the steering motor 16.

Should the ship's deviation still be increasing, the overlapping of plate 218 and the emf in coil 159 will continue to increase with the result that tube 169 will resume the passing of current, rudder motor coil 201 will again be energized, and more rudder will be applied. Usually however the ship's deviation will have ceased by the time the rudder has reached the balancing position. The rudder remaining on, the ship will commence to return to its course and the overlap of plate 213 by 48 will decrease. The emf in coil 217 will now overbalance that in coil 159 and as a result the polarity phase in the output from transformer 214 will be reversed. Gaseous discharge tube 171 will thus be energized to pass current to conductor 219 and to coil 221 of relay 153. The gap between the contacts 151 and 223 is now closed by plate 225 and current passes to coil 227 of relay 229, closing the gap between contacts 231 and 233 and energizing coil 235 of rudder motor 16, reversing the motor and taking off rudder. Simultaneously with the closing of contacts 151 and 223, a circuit is broken by plate 225 moving out of contact with contacts 237 and 239. This circuit includes the holding coil 241 of relay 179, the coil 177 of which is already deenergized. On the breaking of the holding coil circuit the relay falls open, opening contacts 209 and 213 but closing a new circuit between contacts 243 and 245. The effect of this is to cut out the resistance 207 in the circuit through transformer coil 217 and to temporarily increase the emf through that coil. It will now be necessary, in order to effect a balance between the emfs in coils 159 and 217, to reduce the overlap between plates 190 and 196 to a greater extent than during the period of rudder application. By this means "lead" is given to the rudder in its return movements and a relatively large amount of rudder is taken off before a balance is effected. The ratio of rudder angularity to course deviation is thus less when the vessel is returning to its course than when departing from its course.

While rudder is being taken off, the ship is returning to its course and both the absolute emf in 159 and the differential emf in 214 are being reduced. Ultimately, as the ship approaches its course and the rudder approaches the neutral position the emf on the grid of the tube 171 is insufficient to pass current and relay 153 is deenergized, thus stopping the rudder.

Should the ship now depart from its course in the opposite direction, plate 132 will be overlapped by plate 48 and gaseous discharge tube 141 will be energized, enabling current to reach contacts 245 and 247. With the rudder neutral and the compass showing a departure, the emf in coil 159 will exceed that in coil 217 and tube 169 will again be energized. In this case however the energization of coil 175 and the closing of relay 157 will permit current to flow from contact 247 to contact 249, contact 155 being dead. From 249 current flows to coil 227 of relay 229, energizing rudder motor coil 235, which turns the rudder in the proper direction to correct for the new departure. Relay 179 also being energized, resistance 207 is in series with resistance 205, requiring a relatively large amount of rudder to effect a balance in transformer 214. Upon this balance being effected, tube 169 is deenergized and relay 157 falls open, stopping the rudder motor. As the ship returns to its course tube 171 is again energized and current flows to coil 221 of relay 153, actuating the relay and closing the gap between contacts 245 and 251. Relay 191 is thus actuated and coil 201 of motor 16 energized, reversing the motor and taking off rudder. As in the previous case, the gap between contacts 237 and 239 is also opened, breaking the circuit to the holding coil 241. Relay 179 thereupon falls open and resistance 207 is cut out of the circuit to transformer coil 217, resulting in the removal of a large amount of rudder before a balance is effected between rudder and compass circuits.

It will be noted (Fig. 6) that rudder controlled condenser plates 196 are shaped differently from compass controlled condenser plates 218. The latter are so designed that the amount of current flowing from plates 48 is proportional to the angle of overlap. In the case of plates 196 however a larger angle of overlap than the mean is initially necessary to permit the flow of a given amount of current from plates 190, while finally the increment of overlap for a given increment in current flow is less than the average. As a result a relatively large overlap is initially necessary to produce a balance between coils 159 and 217 and hence a relatively large amount of rudder is applied to correct for an initial compass deviation, decreasing angular rudder increments being applied to correct for further increments in compass deviation.

Figure 12:
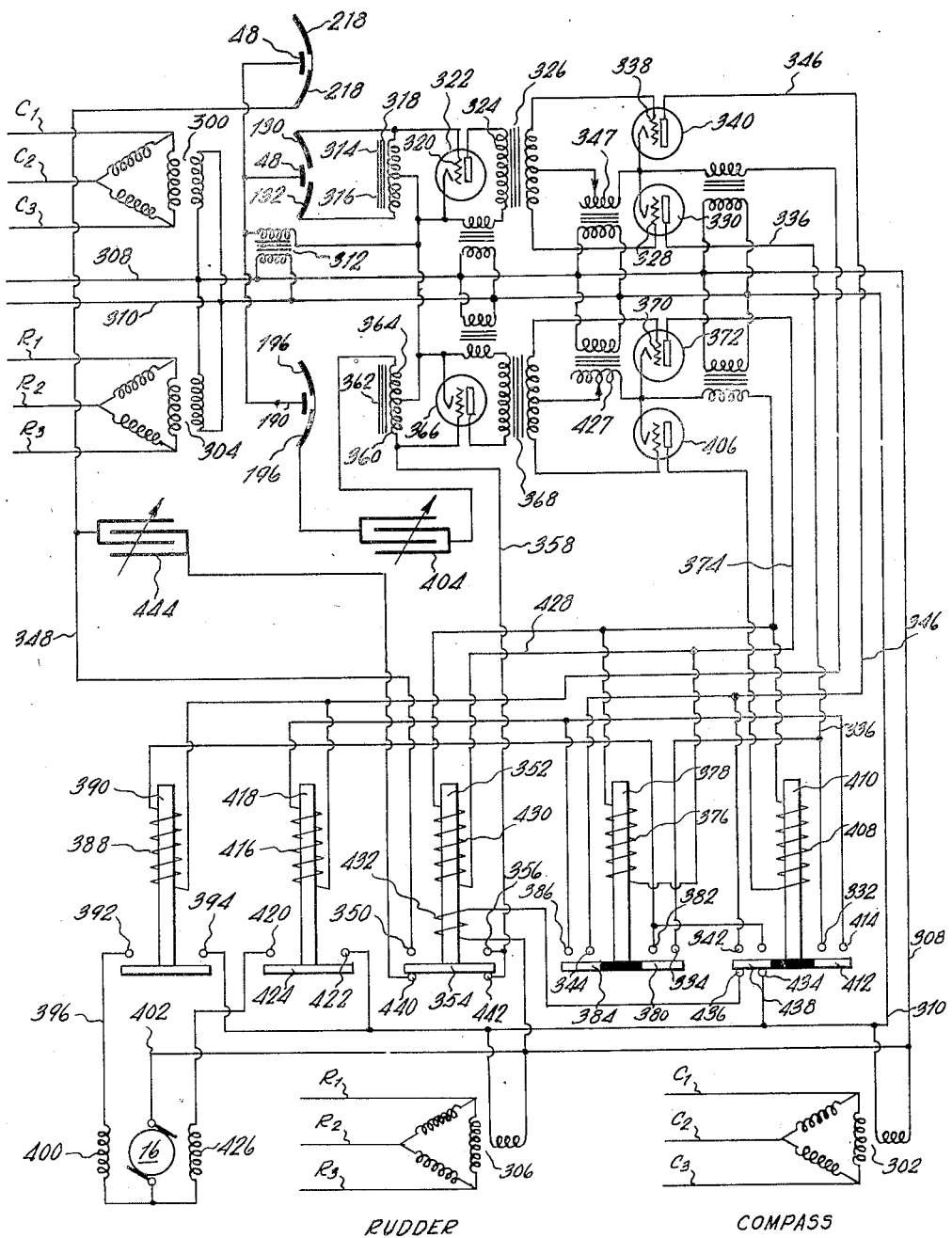
Fig. 12 is a diagram of the electrical circuits for use in a modified system applicable for use on commercial vessels.

In Fig. 12 is shown a slightly modified circuit more suitable for use in commercial vessels or in cases where a source of alternating current is available. The air driven gyro of Fig. 1 is replaced by a Selsyn repeater 300, the rotor of which carries condenser plates 48 and an indicator card corresponding to card 50. This Selsyn is electrically connected with a transmitter 302 geared for example to the phantom ring of a gyro compass. The card 50 of the repeater thus not only remains fixed in azimuth but may be used also for compass indications. The cable actuated shaft 68 of the rudder responsive element of Fig. 1 is replaced by the rotor of a Selsyn repeater 304 which is electrically connected with a Selsyn transmitter 306 geared to the vessel's rudder and adapted to repeat the angular movements of said rudder. The rotor of this second repeater carries condenser plates 190, similar to those of unit 20 in Fig. 1.

Alternating current is supplied to condenser plates 48 through slip rings (not shown) and through step up transformer 312 from the A. C. mains 308, 310. Condenser plates 48 engage one of the sets of plates 130, 132 in the manner previously described. The outputs from 130, 132 however are applied to oppositely wound coils 314, 316 of auto-transformer 318. The output from 318 is applied to the grid 320 of the amplifier tube 322, the amplified current from which is applied to the primary 324 of transformer 326.

Assuming now that the polarity phase of the current passing through transformer 326 as the result of an overlapping by plate 48 of plates 130 or 132 is such as to energize grid 328 of gaseous discharge tube 330, a path is provided for flow of current to contacts 332 and 334 by way of conductor 336. Similarly, should the polarity phase be such as to energize grid 338 of gaseous discharge tube 340, a path for current is provided to contacts 342 and 344 by way of conductor 346. The sensitivity of response may be varied by changing the bias of adjustable transformer 347, which may be arranged for manual control. Normally however this will be set to give the desired sensitivity and no further adjustment will be necessary.

When the vessel commenced to deviate from its course condenser plates 48 also began to overlap plates 218 allowing current to flow through conductor 348 to contact 350. As explained later, relay 352 is energized at this time so that current passes by way of armature 354 to contact 356 and conductor 358 to coil 360 of autotransformer 362. The rudder being in neutral position, this current exceeds the current if any flowing through the opposing coil 364 from rudder controlled condenser plates 196. The polarity phase of the resultant amplified by tube 366 and transformer 368 is such as to energize the grid 370 of gaseous discharge tube 372, permitting current to pass by conductor 374 to the coil 376 and energizing relay 378, thus causing armature 380 to bridge the gap between contacts 334 and 382, and armature 384 to bridge the gap between contacts 344 and 386. Assuming that the direction of departure is such that gaseous discharge tube 330 is energized current now flows from contact 334 through armature 380 and contact 382 to coil 388 of relay 390, closing the gap between contacts 392 and 394 and permitting current to flow from A. C. main 310 through conductor 396 to coil 400 of steering motor 16, and back to A. C. main 308 by conductor 402.

Rudder is now steadily applied with the result that condenser plate 190 commences to overlap one of the plates 196 permitting current to flow to the rudder amplitude adjusting condenser 404, to the coil 364 of autotransformer 362. This movement continues until the current through 364 substantially balances that through 360, reducing the potential at grid 370 until tube 372 is no longer able to pass current. As a result relay 378 is deenergized, plate 380 falls away from contacts 334 and 382, relay 390 is thus deenergized, and the steering motor is stopped. The ship is now returning to her course and the current through coil 360 is therefore decreasing. Current through 364 now exceeds that through 360 and the polarity phase through transformer 368 is reversed and the gaseous discharge tube 406 is energized permitting current to flow to the coil 408 and energizing relay 410. Current now flows through the still energized tube 330 to contact 332, plate 412, contact 414, to coil 416 of relay 418. The gap between contacts 420 and 422 is now closed by armature 424 and current flows from A. C. main 310 to coil 426 of steering motor 16, reversing said motor and removing rudder. The sensitivity of response may be varied by adjustment of the biassing transformer 427.

When compass deviation first occurred and tube 372 was energized, current flowed not only to relay 378 but also, by way of conductor 428 to coil 430 of relay 352, energizing this relay and closing the gap between contacts 350 and 356. This relay was also held closed by holding coil 432, which was energized by current from A. C. main 310 flowing through contacts 434 and 436 by way of armature 438. Thus when tube 372 was deenergized, relay 352 remained in because of the holding coil. When tube 406 was energized however, energizing relay 410, the circuit between 434 and 436 was opened, the coil 432 deenergized, and the armature 354 fell away from contacts 350, 356 into engagement with contacts 440, 442, thus cutting into the circuit to transformer coil 360 the adjustable condenser 444, thereby increasing the impedance of the compass circuit. To effect a balance between compass and rudder circuits then required an increase in impedance of the rudder circuits, requiring the immediate removal of a considerable percentage of the rudder previously applied.

What I claim is:

1. A departure control arrangement for rudder-controlled craft which includes, means to produce an E. M. F. proportional to the deviation of the craft from a chosen heading, means to produce an E. M. F. proportional to the angularity of the rudder, means to compare said E. M. F.'s, means to apply rudder to check said deviation so long as the ratio of said E. M. F.'s is different from a predetermined value and to remove rudder when said predetermined value is reached, the last-mentioned means including a device whereby the ratio of rudder application to craft deviation is greater during the initial stages of correction, said ratio of rudder application to craft deviation thereafter decreasing until said predetermined value is attained.

2. A departure control arrangement for rudder-controlled craft which includes, means to produce an E. M. F. proportional to the ratio of craft deviation to rudder angularity, means to apply rudder under control of said E. M. F. to check said deviation and to stop said rudder application when said ratio is at a predetermined value, and means for automatically withdrawing rudder to restore the craft to a predetermined heading, the ratio of incremental rudder application with respect to incremental craft deviation being different from the ratio of incremental rudder withdrawal to incremental craft correction.

3. A departure control arrangement for rudder-controlled craft which includes, means to produce an E. M. F. in accordance with the craft deviation, means to produce another E. M. F. in accordance with rudder angularity, the rate of variation of the first E. M. F. with respect to craft deviation being substantially constant and the rate of variation of said second E. M. F. with respect to rudder angularity being non-uniform, and means to control the rudder automatically by said E. M. F.'s so that the ratio of rudder angularity to craft deviation is less when the craft is returning to its course than when it is deviating from said course.

4. A departure control arrangement for rudder-controlled craft which includes, means to produce an E. M. F. in accordance with craft deviation, means to produce another E. M. F. in accordance with rudder angularity, means to maintain automatically the rate of variation of the first E. M. F. with respect to rudder angularity initially low but increasing for successive increments for rudder angularity.

5. A departure control arrangement for rudder-controlled craft which includes, means to produce a first E. M. F. which is proportional to the deviation of the craft from a chosen heading, means to produce a second E. M. F. having a polarity phase corresponding to the direction of said deviation, means to apply rudder in the direction corresponding to said polarity phase to correct said deviation, means to produce a third E. M. F. proportional to the rudder angularity, means to compare said first and third E. M. F.'s, means controlled by said comparison means to stop rudder application when said third E. M. F. attains a predetermined relation to said first E. M. F., means to withdraw rudder when said third E. M. F. exceeds said first E. M. F. and for increasing said third E. M. F. relative to said first E. M. F. in a predetermined proportion and to rebalance said first and third E. M. F.'s until said first E. M. F. is reduced to a predetermined minimum.

6. A departure control arrangement for rudder-controlled craft which includes, a pair of amplifiers each having a divided input circuit, means controlled by the craft deviation to apply differential E. M. F.'s to one of said input circuits, means controlled by the craft deviation and by the angularity of the rudder for applying other differential E. M. F.'s to said other input circuits, a motor for automatically controlling said rudder, and circuit arrangements for controlling the direction of motor rotation by the first amplifier and the duration of the rotation by the second amplifier.

7. An arrangement according to claim 6 in which the second amplifier includes a pair of grid-controlled gas tubes having their input circuits connected in balanced relation so as to be rendered conductive in accordance with the polarity phase of the said other E. M. F.'s.

8. An arrangement according to claim 6 in which the input circuit of each amplifier has connected differentially thereto the plates of a pair of electrostatic condensers, the rotor of one condenser being movable in accordance with the craft deviation and the rotor of the other condenser being movable in accordance with the rudder angularity.

9. A departure control arrangement for rudder-controlled craft including, a first pair of signal pick-up elements, a second pair of signal pick-up elements, movable coupling means associated with said first pair of elements for exciting said first pair of elements differentially in accordance with the direction of deviation of the craft from a chosen heading, a grid-controlled tube having its input circuit connected to said first pair of elements, movable coupling means associated with said second pair of elements and arranged to be excited respectively in accordance with the magnitude of said deviation and in accordance with the rudder angularity, a grid-controlled tube having its input circuit connected to said second pair of elements, a motor for moving said rudder, circuit arrangements controlled by the output of the first tube for determining the direction of rotation of said motor, and circuit arrangements controlled by the output of said second tube for determining the duration of rotation of said motor.

10. A departure control arrangement according to claim 9 in which the first-mentioned circuit arrangements include a pair of grid-controlled tubes having their inputs connected in phase opposition to the output of said first tube.

11. A departure control arrangement according to claim 9 in which the second-mentioned circuit arrangements including a pair of grid-controlled gas tubes having their input circuits connected in phase opposition to the output of said second tube.

12. A departure control arrangement according to claim 9 in which one of the signal pick-up devices of said second pair is arranged to be excited in accordance with the rudder angularity so that the rate of excitation per unit of rudder angularity is different when the craft is returning to its course than when it is departing from its course.

13. A departure control arrangement according to claim 9 in which the one of said second pair of pick-up elements which is excited in accordance with the rudder angularity is connected in circuit with the signal source through an impedance, and a relay is provided for controlling the effective magnitude of said impedance, said relay being connected in circuit with said second tube and arranged to reduce the magnitude of said impedance when the craft is returning to its chosen heading.

14. A departure control arrangement according to claim 9 in which said signal pick-up elements are in the form of electrostatic condenser plates, and said movable coupling elements are in the form of electrostatic condenser plates.

15. A departure control arrangement according to claim 9 in which the signal pick-up element which is arranged to be excited in accordance with the rudder angularity is arranged with respect to its associated movable coupling element so that the effective coupling increases relatively slowly for corresponding initial movements of the rudder and increases rapidly during the final stages of the rudder movement, whereby the initial amount of rudder application is in excess of that necessary to correct for the mean deviation and successive increments of rudder application are successively less in proportion to successive increments in deviation from said mean.

16. A departure control arrangement for rudder-controlled craft which includes, means to produce an E. M. F. proportional to the ratio of craft deviation to rudder angularity, means to apply rudder under control of said E. M. F. to check said deviation and to stop said rudder application when said ratio is at a predetermined value, and means for automatically withdrawing rudder to restore the craft to a predetermined heading, the ratio of rudder angularity to craft deviation being less when the craft is returning to its course than when it is deviating from said course.

HUMPHREY F. PARKER.